United States Patent
Setchell et al.

(10) Patent No.: US 10,852,196 B2
(45) Date of Patent: Dec. 1, 2020

(54) PRODUCT TEMPERATURE MONITORING

(71) Applicant: Spot You More, Inc., Raleigh, NC (US)

(72) Inventors: Joel R. Setchell, Advance, NC (US); James D. Haley, Winston-Salem, NC (US)

(73) Assignee: Spot You More, Inc., Raleigh, NC (US)

(*) Notice: Subject to any disclaimer, the term of this patent is extended or adjusted under 35 U.S.C. 154(b) by 126 days.

(21) Appl. No.: 15/606,237

(22) Filed: May 26, 2017

(65) Prior Publication Data
US 2017/0351276 A1 Dec. 7, 2017

Related U.S. Application Data

(60) Provisional application No. 62/343,999, filed on Jun. 1, 2016.

(51) Int. Cl.
G01K 3/00 (2006.01)
G06F 16/23 (2019.01)
G01K 1/02 (2006.01)
G06Q 50/12 (2012.01)
G07F 11/00 (2006.01)
(Continued)

(52) U.S. Cl.
CPC ......... *G01K 3/005* (2013.01); *F27D 21/0014* (2013.01); *G01K 1/02* (2013.01); *G06F 16/23* (2019.01); *G06Q 20/20* (2013.01); *G06Q 30/0238* (2013.01); *G06Q 50/12* (2013.01);
(Continued)

(58) Field of Classification Search
None
See application file for complete search history.

(56) References Cited

U.S. PATENT DOCUMENTS 8,101,892 B2* 1/2012 Kates .................... B65D 79/02
219/494
9,471,206 B2* 10/2016 Girardeau .......... G06F 3/04842
(Continued)

FOREIGN PATENT DOCUMENTS

KR 2001 0055962 A 7/2001
WO WO 01/97556 A2 12/2001
(Continued)

OTHER PUBLICATIONS

Laguerre et al ("Influence of room temperature on food safety in refrigerated display cabinet", presentation to the 11th International Congress on Engineering and Food, 2011) (Year: 2011).*
(Continued)

*Primary Examiner* — Clayton E. LaBalle
*Assistant Examiner* — Leon W Rhodes, Jr.
(74) *Attorney, Agent, or Firm* — Brinks Gilson & Lione

(57) ABSTRACT

A system for monitoring a temperature of a product. The system may include a product preparation or dispensing unit containing the product and at least one temperature sensor proximate the product and configured to measure the temperature of the product. The temperature sensor may include a transmitter to transmit a temperature measurement to a processor. The processor may generate offers or initiate maintenance tasks related to the product in response to the temperature measurement of the product.

14 Claims, 1 Drawing Sheet

(51) Int. Cl.
*G06Q 30/02* (2012.01)
*F27D 21/00* (2006.01)
*G06Q 20/20* (2012.01)

(52) U.S. Cl.
CPC .......... *G07F 11/00* (2013.01); *G01K 2207/02* (2013.01)

(56) References Cited

U.S. PATENT DOCUMENTS

| | | | |
|---|---|---|---|
| 9,852,468 B2* | 12/2017 | Abell | G06Q 30/0641 |
| 2010/0001924 A1* | 1/2010 | Nobutsugu | G06Q 30/06 345/1.1 |
| 2011/0004502 A1* | 1/2011 | Dillard | G06Q 10/06 705/7.34 |
| 2011/0054992 A1* | 3/2011 | Liberty | G06Q 30/02 705/14.24 |
| 2012/0035761 A1 | 2/2012 | Tilton et al. | |
| 2014/0134299 A1* | 5/2014 | Guidorzi | A47J 31/4492 426/87 |
| 2015/0064314 A1* | 3/2015 | Manuel | A47J 27/62 426/231 |
| 2015/0150088 A1 | 5/2015 | Haga et al. | |
| 2015/0355036 A1* | 12/2015 | Giorgi | H04L 12/2825 702/130 |
| 2016/0338540 A1* | 11/2016 | Park | G06Q 50/12 |

FOREIGN PATENT DOCUMENTS

WO  WO 2013/138839 A1  9/2013
WO  WO 2015/164366 A1  10/2015

OTHER PUBLICATIONS

International Search Report, International Application No. PCT/US2017/034643, dated Feb. 23, 2018, 6 pgs.

\* cited by examiner

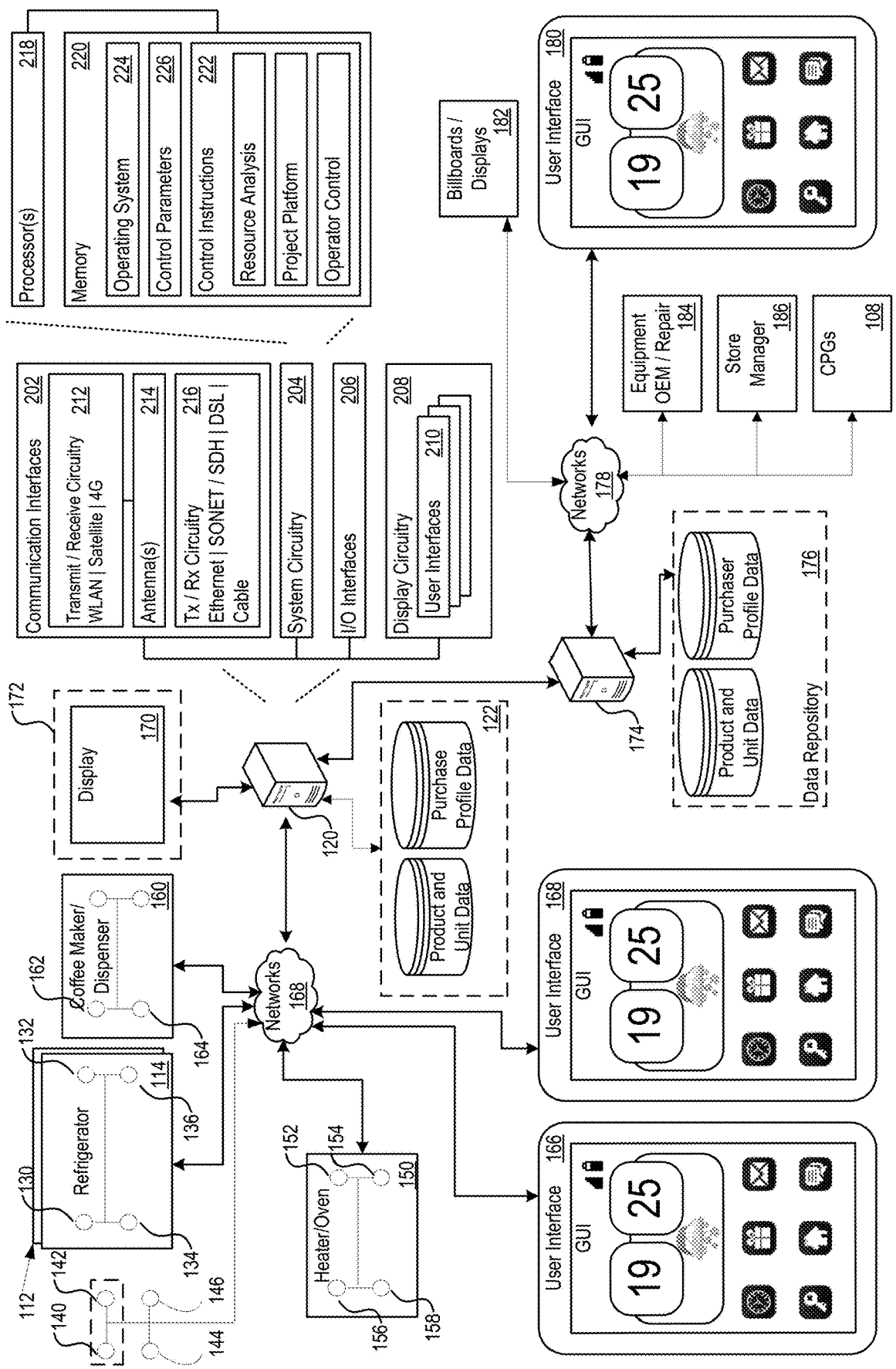

PRODUCT TEMPERATURE MONITORING

CROSS REFERENCE TO RELATED APPLICATIONS

This application claims the benefit of U.S. Provisional Patent Application No. 62/343,999 filed Jun. 1, 2016, the content of which is hereby incorporated by reference in its entirety.

BACKGROUND

1. Field of the Invention

The present invention generally relates to product temperature monitoring.

2. Description of Related Art

Convenience stores, especially stores attached to gas stations, are starting trying to increase revenue by selling a variety of items including items that include some preparation. Many convenience stores may have difficulty implementing policies and procedures to provide such items.

In view of the above, it is apparent that there exists a need for a system for monitoring product temperature.

SUMMARY

The present disclosure describes a system for temperature monitoring of products, for example, items dispensed and/or prepared at a convenience store.

The disclosure discusses some implementations of a system for monitoring a temperature of a product, where the system comprises a product preparation or dispensing unit, at least one temperature sensor and a processor. The product preparation or dispensing unit contains the product which is monitored. The at least one temperature sensor may be attached to the product preparation or dispensing unit proximate the product and configured to measure the temperature of the product. The processor may be in communication with the at least one temperature sensor and configured to retrieve a temperature threshold from a product profile and compare the temperature of the product to the temperature threshold, the processor being configured to transmit a message including the product temperature for presentation on a display device when the product exceeds the temperature threshold associated with the product. In some implementations, the processor may be located on a same premises as the product preparation or dispensing unit. In some implementations, the processor may be located on a separate premises remote from where the product preparation or dispensing unit is located.

The processor may be configured to make a determination of whether a door of the product preparation or dispensing unit has been left open based on a comparison between a first temperature sensor and a second temperature sensor attached to the product preparation or dispensing unit. The processor may be configured to retrieve the threshold amount of time from a profile associated with the product preparation or dispensing unit. The processor may be configured to determine an amount of time from the message being transmitted until the position sensor no longer exceeds the position threshold. The processor may be configured to generate an electronic coupon in response to the temperature of the product. The processor may be configured to communicate with a user owned device to determine an identity of a consumer, access a consumer profile, and generate an electronic coupon in response to the temperature of the product. The processor may be configured to communicate the message with an equipment manufacturer or repair facility and generate a work order in response to the temperature of the product.

In some implementations, the system may include a humidity sensor configured to measure a humidity of the product, and the processor may be configured to generate the message based on the humidity of the product. In some implementations, the system may include a position sensor configured to measure a position of a door of the product preparation or dispensing unit and generate the message that the door is left open, in response to the position sensor exceeding a position threshold for a threshold amount of time.

The system may include a display device configured to generate a store image including the product preparation or dispensing unit and overlay sensor positions with indicators corresponding to measurements that have exceeded product temperature thresholds. The display device may be a point of sale (POS) machine.

The disclosure discusses implementations of a system for monitoring a temperature of a product, where the system includes: a product preparation or dispensing unit containing the product; at least one temperature sensor proximate the product and configured to measure the temperature of the product; at least one temperature sensor configured to measure an ambient temperature; and a processor configured to compare the temperature of the product to the ambient temperature, the processor being configured to transmit the ambient temperature and the product temperature for presentation on a display device. The processor may be configured to communicate with a billboard remote from a premises of the product preparation or dispensing unit, the billboard being configured to display the ambient temperature and the product temperature. The processor may be configured to generate an electronic coupon in response to the temperature of the product and the ambient temperature. The ambient temperature may be an outdoor temperature.

The disclosure discusses implementations of a system for monitoring a temperature of a product, where the system comprises: a product preparation or dispensing unit containing the product; at least one temperature sensor proximate the product and configured to measure the temperature of the product; at least one temperature sensor configured to measure an ambient temperature; and a processor configured to compare the temperature of the product to the ambient temperature, the processor being configured to transmit a message including the ambient temperature and the product temperature for presentation on a display device when the ambient temperature exceeds an ambient temperature limit associated with the product and the product temperature exceeds a product temperature limit associated with the product. The processor may be configured to retrieve the product temperature limit stored in a database and associated with a record of the product. The processor may be configured to retrieve an ambient temperature limit stored in a database and associated with a record of the product.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 1 is a block diagram of a system for product temperature monitoring.

DETAILED DESCRIPTION

Sensors may be used in conjunction with retail locations such as convenience stores and gas stations. The sensors may be located outside store location, in the freezer, refrigerator, heater/oven, coffee maker/dispenser, and/or in perishable food areas where temperature and humidity may be monitored to ensure quality of food. Based on defined logic and thresholds defined within a cloud based analytics platform. The analytics platform may house the data pushed up from the sensor devices, notification alerts are triggered based on certain events and/or certain data is distributed to relevant stakeholders based on a defined frequency or immediately based on certain conditions being met.

Data that is to be collected by the smart sensors and pushed to the cloud to be analyzed includes, but may not be limited to: current temperature, changes in temperature, motion/position data (e.g. cooler or heat-oven opened/closed and how often), and humidity levels. The relevant stakeholder groups that will receive notification alerts and/or data include, but may not be limited to store clerks, store managers, CPGs, consumers, and equipment OEMs. As a general rule, each notification trigger and data distribution set discussed in this disclosure can be mapped (one to one [1-1] and/or one to many [1-n]) to each of the delivery channels/mechanisms discussed.

Now referring to FIG. 1, a system for temperature monitoring of product is provided. A system may include a number of sensors monitoring product and equipment at a retail location such as a convenience store. One example of a convenience store a implementation is provided. Although the system may interact with multiple sensors at multiple convenience store locations simultaneously. The sensors may be smart sensors and therefore may receive and/or send data to a monitoring production server either directly or through a hub. A smart sensor may include a processor. A processor may allow the sensor to sample and transmit data upon receipt of a command to do so and/or continuously sample data to provide a continuous stream of data with regard to the characteristic dual monitor, and/or monitor the data and evaluate if the data exceeds certain defined thresholds and send an alert in response to the monitored characteristic exceeding one or more thresholds. The alert may include and alert classification as well as the monitored data. The processor may also provide for the measurement unit to be calibrated and/or reset at the location of the sensor or remotely from a server. The sensor may include a display and/or end-user interface (e.g. buttons or switches, etc.) for setting and reviewing real time data as well as setting and monitoring alert information or threshold information. The sensors monitor characteristics of products stored in a product preparation or dispensing unit (e.g. temperature, humidity, time) or characteristics of the preparation and dispensing unit itself (power, doors open/closed, temperature, humidity, time, amount of product contained, etc.). Alerts may be generated in response to any of the product or unit characteristics noted above, either based on a threshold, or a comparison with other product or unit characteristics.

The sensors may monitor characteristics of one or more refrigerators 112. The first refrigerator 114 may include a temperature sensor 130 that is located in close proximity to the products and the refrigerator. As such, the temperature sensor 130 may provide a measurement of the temperature of the product. For example, the product may be various items that are stored in a convenience store refrigerator. Such items may include but are not limited to water, soft drinks, juices, and other beverages as well as various food items. Sensor 132 may be a humidity sensor located approximate products in the refrigerator. As such, the sensor 132 may measure the humidity at the container of the product. The refrigerator 114 may include one or more additional temperature sensors 134 located away from the product, for example, near the door. In comparison between the sensor 130 and the at least one sensor 134 the system may determine various information about the refrigerator system. For example, alert may be set to indicate that the refrigerator door is opened based on a temperature difference between the product 130 and the temperature sensor 134.

In other implementations, the difference between the sensor 130 and the sensor 134 may be used to determine if the refrigeration is operational and functioning properly. Based on analysis over time in comparison may also provide information about energy usage of the refrigerator and/or whether the refrigerator is performing to operational specifications. If the refrigerator is not operating to its operational specifications according to the monitoring data of the sensors individually or in combination an alert may be sent to various parties including the store manager, a corporate monitoring entity, and/or an equipment manufacturer and/or repair facility. In addition, other sensors may be provided in the refrigerator including a door position sensor 136 to determine if a door is opened or closed and the frequency of the door opening and closing. The refrigerator may also include a sensor to determine the amount of product on the shelves using a position sensor, a optical scanning sensor, or a weight sensor. Alerts may be generated based on the amount of product in the refrigerator when compared to a fill threshold. The store clerk may be notified to restock or manufacturers may be notified to order more product. This information may also be used to generate electronic coupons or in store advertisements in response to the amount of a particular product that is available. (e.g. if it is below a threshold offers such as discounts may be given to sell the last one, alternatively if it is fresh offers may be generate informing of fresh product.) Data from these sensors may be communicated to a router or server 120 via a network 118. The network may be a wired network and/or a wireless network. As such, the sensors may include a wireless transmitter to connect to the server 120 via a wireless network such as Wi-Fi, BlueTooth, etc.

The system 100 may also include sensors for measuring ambient temperature or humidity. For example, the system may include a temperature sensor 140 located outside of the convenience store but on the convenience store property as denoted by reference numeral 138. In addition, the system may include a humidity monitor 142, sensors 140-142 may provide information about the outside weather conditions and the area surrounding the convenience store. In addition, the system 100 may include a temperature sensor 144 and a humidity monitor 146 within the convenience store to monitor the temperature and humidity conditions inside of the convenience store that may affect performance of other equipment for example the refrigerators 112, or other devices such as ovens, heaters, coffee makers, or other food and beverage preparation and/or dispensing devices.

The system 100 may also include a temperature sensor 152 connected to monitor the temperature of an oven/heater device 150 used for food preparation and/or dispensing in a convenience store. Temperature sensor 152 may be located approximate product to measure a temperature of the product. The product may include heated beverages or food. Food may be a pizza in a pizza oven, or hot dogs, and/or sausages on a roll cooker. A position sensor 154 may also be provided to monitor the opening or closing of a door or access generally to the oven or heater. As such, the system can determine the frequency and duration at which the door was open and the effects on the temperature of the product and/or alert if the temperature of the product exceeds certain thresholds or if the access to the heater or oven is left open for longer than a certain duration. It is also understood that multiple temperature sensors may be used to determine access to the heater or oven as well as functioning of the heater or oven in a manner described above with respect to the refrigerator 114.

The heater/oven may also include a humidity sensor 156 and a sensor 158 to determine the amount of product on the shelves. The amount of product may be determined using a position sensor, a optical scanning sensor, or a weight sensor. Alerts may be generated based on the humidity or the amount of product in the heater/oven when compared to a fill threshold. The store clerk may be notified to restock or manufacturers may be notified to order more product. This information may also be used to generate electronic coupons or in store advertisements in response to the amount of a particular product that is available. (e.g. if it is below a threshold offers such as discounts may be given to sell the last one, alternatively if it above a threshold offers such as discounts or notifications may be generated informing consumers of fresh product.).

In addition, the temperature sensor 162 may be provided with respect to measuring the temperature of coffee in a coffee maker or storage unit 160. A fill sensor 164 may determine whether the coffee maker or storage unit is filled with coffee. The threshold limit may be set to alert the server 120 if the coffee fill level is below a certain level. The coffee maker may also include a position sensor to track access to the amount of times the coffee has been accessed and provide an alert to the server 120 if the coffee has been accessed for a threshold limit of time, and/or a threshold number of times, and/or a threshold frequency within the given time period. Upon receiving the data from the sensors the server 120 may store the data locally in a storage device 122. The server may also analyze the data and determine certain thresholds based on the characteristics of the sensor exceeding a certain value, or based on the comparison between various sensors, or based on an alert provided from a particular sensor the server 120 may communicate with a mobile device 166 that may be configured with an application for notifying a store clerk with an action needed to be taken with regard to a food or beverage storage or corporation. In addition, the server 120 may communicate with a mobile device 168 from a consumer based on an application loaded on the mobile device 168.

The application may allow the user to receive communication from a local network within the store. The application may allow the mobile device 168 to provide a user interface to present offers and/or electronic coupons to the consumer in response to the characteristics monitored by the smart sensors and/or a comparison of the smart sensors and/or a comparison of the monitored data with a threshold. In addition, the server 120 may be in communication with a display device 170 located within the store or on the store grounds as noted by box 172. The display 170 may be a public display, for example, a monitored unit or sign display to provide an offer to a consumer in response to monitor temperature information. The server 120 may communicate with an external server 174 located in a remote location such as corporate headquarters. The server 174 may receive data from the server 120. The server 120 may push the data to the server 174 and/or, the server 174 may request the data from the server 120. The data may be streamed in real time to the server 174 or accumulated and provided in batches, for example, after the store is closed or in the late evening hours. Further, certain data may be provided at different times based on a data priority. For example, alerts characteristic exceeded a certain threshold and generate a message that is immediately transmitted from server 120 to server 174 whereas the actual monitored data may be transmitted at a later time as a different priority. The data that the server 174 may be stored in a data storage unit 176 and may be retrieved by server 174 or other servers for additional data analysis. The server 174 may communicate via a network 178 with various other devices. For example, server 174 may communicate with a billboard display 182. The billboard display may display the characteristics that are monitored by the sensors located on the product preparation or dispensing devices. In addition, the billboard display may display ambient temperature information from the store or from the remote sensor on the temperature billboard as a comparison with the temperature of the food product being monitored by the system. The server 174 may communicate with an equipment OEM or repair facility 184. The server 174 may communicate with the equipment OEM or repair request system 184 to request maintenance on a food preparation or dispensing system. Further the system 174 may generate an offer such as an electronic coupon and send the electronic coupon to a user device 180 based on the monitor temperature information and additional information including for example the user profile information stored on the server 174 or the remote device 180, the location information related to the electronic device 184, and other factors including, for example, the temperature or humidity measurements or comparisons between measurements.

Store Clerk

The store clerk may receive notifications for various situations. The determination to transmit the notification may be in the server 120 located in the store 110 and/or by the remote server 174. The store clerk may receive notifications on a mobile or display device through a local network via server 120. The store clerk may receive notifications on various devices through a wide area network via server 120 or remote server 174. Notifications may be triggered in response to various events such as, Temperature in cooler exceeds (higher or lower than) a temperature threshold, Temperature in heater/oven falls below temperature threshold, Cooler door has been left open above time threshold, Heater/oven door has been left open above time threshold, Humidity in cooler exceeds temperature threshold, Humidity in heater/oven falls below temperature threshold, Outdoor temperature exceeds or falls below a certain threshold, Cooler is due for maintenance, based on defined frequency, Heater/oven/coffee maker or dispenser is due for maintenance, based on defined frequency.

Individual notification triggers can be delivered via any or all of a POS system, Tablet App, Smartphone (App, SMS), Smartwatch (E-Mail), Other wearable devices (E-mail, App, notification, SMS). General data may be distributed at the defined frequency, distributed based on a trigger or threshold being exceeded, and accessible any time in dashboard form via any or all of POS system, Tablet App, Smartphone (App, SMS link to Web landing).

Additional data sources that are potentially relevant for the store clerks may include Corporate systems (compliance info, updated process guidelines, other), CPG systems (offer availability), POS data (consumer purchasing history). Potentially amended process/use case for store clerks may include updated compliance information being sent from corporate systems to the store and, in combination with data sent from sensor device(s), the store clerk amends the temperature thresholds or dashboard reporting frequencies (or other compliance related metrics) that have been previously set. Another process may include the clerk receiving alert when a regular product (e.g. coca-cola, tobacco products, etc.) purchaser (based on POS data history) enters the store. If the temperature is above a certain threshold, he/she will be prompted to open offer dashboard provided by CPG (coca-cola) system, check if an offer is available and, if so, volunteer to the consumer that the offer is available.

Store Manager

The store manager may receive notifications for various situations. The determination to transmit the notification may be in the server 120 located in the store 110 and/or by the remote server 174. The store manager may receive notifications on a mobile or display device through a local network via server 120. The store manager may receive notifications on various devices through a wide area network via server 120 or remote server 174. Notifications may be triggered based on events such as, Cooler maintenance, as scheduled, is missed, Heater/oven/coffee maker or dispenser maintenance, as scheduled, is missed. Additional collected data from the sensors may be delivered at defined time/time interval(s) and analyzed for sending additional notifications based on a exceeding a threshold (upper, lower, or based on a comparison) of one or more of Average cooler temperature over defined time period, Average heater/oven temperature over defined time period, Number of notification triggers and their type (e.g. cooler temp fell below threshold x times in y hours), Time to corrective action, Door open and close frequency over defined time period, Max temperature swing over defined period of time, Map of sensors and their plotting across store, Completed tasks over defined time period (maintenance, cleaning), Average outside temperature, number of temperature driven CPG offers (e.g. coupons or electronic coupons) triggered—by product, over a defined period of time, number of temperature driven CPG rebates triggered—by product, over a defined period of time.

Individual notification triggers can be delivered via any or all of POS system, Tablet App, Smartphone (App, SMS), Smartwatch (App, SMS), Other wearable devices (E-mail, App, notification, SMS), Desktop PC (E-Mail, Web Landing Page), Laptop PC (E-Mail, Web Landing Page). General data may be distributed at the defined frequency, distributed based on a trigger or threshold being exceeded, and accessible any time in dashboard form via any or all of POS system, Tablet App, Smartphone (App, SMS link to Web landing), Smartwatch (App, SMS link to Web landing), Other wearable devices (E-mail, App, notification, SMS), Desktop PC (E-Mail, Web Landing Page), Laptop PC (E-Mail, Web Landing Page).

Additional data sources that are potentially relevant for the store managers may include Corporate systems (compliance info, updated process guidelines, other), CPG systems (offer availability), Store systems (clerk performance history), POS system (consumer purchasing history). Potentially amended process/use case for store managers may include updated compliance information being sent from corporate systems to the store and, in combination with data sent from sensor device(s), the store clerk amends the temperature thresholds that have been set. Another process may include generating information accessible in dashboard form for manager to pull down. Based on temperature info provided by the sensor device, the manager may be presented with a interface to 'activate' an offer that is relevant in select stores for a certain period (e.g. if it is 90 degrees in the heat of summer, perhaps $1 off cold coca-cola makes far more sense than 50 cents off hot chocolate). Another process may include generating dashboard reports for sensor device, pushed to the manager at a defined frequency, that provide info, graphics, and/or alerts around sensor management and compliance can be a key data point that is used in combination with other clerk performance data to enhance the performance appraisal process.

CPGs

The CPGs or food service vendors may receive notifications for various situations. The determination to transmit the notification may be in the server 120 located in the store 110 and/or by the remote server 174. The CPGs or food service vendors may receive notifications on a mobile or display device through a local network via server 120. The CPGs or food service vendors may receive notifications on various devices through a wide area network via server 120 or remote server 174. In one example, the provider of hot dogs to a convenience store might want to know that its product is being maintained at optimal temperature for consumption. This would be helpful if the chain were to receive consumer complaints about the product, the hot dog provider would have data to show that its product is not the issue. Notifications may be triggered based on events such as, Outdoor temperature exceeds or falls below temperature threshold (suggest to give offer), Cooler door has been left open above time threshold, Heater/oven door has been left open above time threshold. Additional collected data from the sensors may be delivered at defined time/time interval(s) and analyzed for sending additional notifications based on a exceeding a threshold (upper, lower, or based on a comparison) of one or more of Average cooler temperature over defined time period, Average heater/oven temperature over defined time period, Number of notification triggers and their type (e.g. cooler temp fell below threshold x times in y hours), Time to corrective action, Door open and close frequency over defined time period, Max temperature swing over defined period of time, Average outside temperature, Temperature driven offer redemptions, Temperature driven rebate redemptions.

Individual notification triggers can be delivered via any or all of POS system, Tablet App, Smartphone (App, SMS), Smartwatch (App, SMS), Other wearable devices (E-mail, App, notification, SMS), Desktop PC (E-Mail, Web Landing Page), Laptop PC (E-Mail, Web Landing Page). General data may be distributed at the defined frequency, distributed based on a trigger or threshold being exceeded, and accessible any time in dashboard form via any or all of POS system, Tablet App, Smartphone (App, SMS link to Web landing), Smartwatch (App, SMS link to Web landing), Other wearable devices (E-mail, App, notification, SMS), Desktop PC (E-Mail, Web Landing Page), Laptop PC (E-Mail, Web Landing Page).

Additional data sources that are potentially relevant for the CPGs may include a POS system (consumer purchasing history). Potentially amended process/use cases for CPGs may include analyzing the propensity for loyal consumers to purchase, as a function of temperature, are made available to the CPG (hence answering the question—how effective are temperature driven product offers).

Consumers

The consumers may receive notifications for various situations. The determination to transmit the notification may be in the server 120 located in the store 110 and/or by the remote server 174. The consumers may receive notifications on a mobile or display device through a local network via server 120. The consumers may receive notifications on various devices through a wide area network via server 120 or remote server 174. Notifications may be triggered based on events such as, temperature driven CPG offer is available, temperature driven CPG rebate is available, Cooler is at a target temperature, Heater/oven is at a target temperature. Additional collected data from the sensors may be delivered at defined time/time interval(s) and analyzed for sending additional notifications based on a exceeding a threshold (upper, lower, or based on a comparison) of one or more of a Rate of equipment in-spec/compliance, temperature driven CPG offer and rebate availability statistics.

Individual notification triggers can be delivered via any or all of an Electronic LED, Tablet App, Smartphone (App, SMS), Smartwatch (App, SMS), Other wearable devices (E-mail, App, notification, SMS), Smart car infotainment (App, Alert). General data may be distributed at the defined frequency and accessible any time via any or all of an Electronic LED, Tablet App, Smartphone (App, SMS link to Web landing), Smartwatch (App, SMS link to Web landing), Desktop PC (E-Mail, Web Landing Page), Laptop PC (E-Mail, Web Landing Page)

Equipment OEMs

The equipment OEMs or repair services may receive notifications for various situations. The determination to transmit the notification may be in the server 120 located in the store 110 and/or by the remote server 174. The equipment OEMs or repair services may receive notifications on a mobile or display device through a local network via server 120. The equipment OEMs or repair services may receive notifications on various devices through a wide area network via server 120 or remote server 174. Notifications may be triggered based on events such as, Maintenance failure/work order request required. Additional collected data from the sensors may be delivered at defined time/time interval(s) and analyzed for sending additional notifications based on a exceeding a threshold (upper, lower, or based on a comparison) of one or more of Average cooler temperature over defined time period, Average heater/oven temperature over defined time period, Number of notification triggers and their type (e.g. cooler temp fell below threshold x times in y hours), Time to corrective action, Door open and close frequency over defined time period, Max temperature swing over defined period of time.

Individual notification triggers can be delivered via any or all of, Tablet App, Smartphone (App, SMS), Smartwatch (App, SMS), Desktop PC (E-Mail, Web Landing Page), Laptop PC (E-Mail, Web Landing Page). General data may be distributed at the defined frequency, distributed based on a trigger or threshold being exceeded, and accessible any time in dashboard form via any or all of Tablet App, Smartphone (App, SMS link to Web landing), Smartwatch (App, SMS link to Web landing), Desktop PC (E-Mail, Web Landing Page), Laptop PC (E-Mail, Web Landing Page).

The server 120 and/or server 174 includes communication interfaces 202, system circuitry 204, input/output (I/O) interfaces 206, and display circuitry 208 that generates user interfaces 210 locally or for remote display, e.g., in a web browser running on a local or remote machine through which a project is defined and resources are selected, evaluated, allocated, and connected to a project. The user interfaces 210 and the I/O interfaces 206 may include graphical user interfaces (GUIs), touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the server 120 and/or server 174. As just one example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the server 120 and/or server 174. The control parameters 226 provide and specify configuration and operating options for the control instructions 222, operating system 224, and other functionality of the server 120 and/or server 174.

The server 120 and/or server 174 may include a local data repository 232 that includes volume storage devices, e.g., hard disk drives (HDDs) and solid state disk drives (SDDs). The storage devices may define and store databases that the control instructions 222 access, e.g., through a database control system, to perform the functionality implemented in the control instructions 222. In the example shown, the databases include a resource data database 228 and a project data database 230. In other implementations, any of the databases may be part of a single database structure, and, more generally, may be implemented logically or physically in many different ways. Each of the databases defines tables storing records that the control instructions 222 read, write, delete, and modify to perform the processing noted below. The resources descriptors may maintain their own resource descriptor data repositories. The system circuitry 204 may implement the resource analysis circuitry 114, project platform circuitry 116, and the operator control circuitry 118, e.g., as control instructions 222 executed by the processor 218.

The thresholds and alerts may be stored in one or more data bases and may be associated with the product or the product preparation unit or the product dispensing unit. For example, separate thresholds for each product characteristic such as temperature, humidity, and time may be stored for each product type in a product record. Separate thresholds for each product preparation or dispensing unit characteristic such as power (on, off, consumption), doors open/closed, temperature, humidity, time, amount of product contained, etc.; may be stored for each product preparation or dispensing unit type in a unit record.

Similar offers such as electronic coupons, in store advertisements or POS offers may be stored in records related to the product, the product preparation or dispensing unit, or a purchaser profile. Further, the offers may be generated and/or delivered in response to characteristics from or combinations of characteristics from the product, the product preparation or dispensing unit, and a purchaser profile. Redemptions of electronic coupons and or purchases corresponding with in store advertisements may be tracked and analyzed with respect to the characteristics (e.g. product temperature, ambient temperature, humidity, and other characteristics) that were used to generate and/or deliver the offer. As such, the usefulness of the offers may be maximized. This may even be controlled in a feedback loop where the thresholds are adjusted based on redemption data and/or purchase correlation data.

The methods, devices, processors, modules, engines, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

As a person skilled in the art will readily appreciate, the above description is meant as an illustration of implementation of the principles this disclosure. This description is not intended to limit the scope or application of this system in that the system is susceptible to modification, variation and change, without departing from the spirit of this disclosure, as defined in the following claims.

We claim:

1. A system for monitoring a temperature of a product, the system comprising:
   a product preparation or dispensing unit containing the product;
   at least one temperature sensor attached to the product preparation or dispensing unit proximate the product and configured to measure the temperature of the product;
   at least one position sensor configured to measure a position of a door of the product preparation or dispensing unit and generate the message that the door is open;
   a database storing a plurality of product profiles including temperature thresholds for storage; and
   a processor in communication with the at least one temperature sensor and the at least one position sensor, the processor being configured to retrieve a temperature threshold from a product profile of the plurality of product profiles and compare the temperature of the product to the temperature threshold, the processor being configured to transmit a message including the product temperature for presentation on a display device when the product exceeds the temperature threshold associated with the product;
   the processor being further configured to retrieve a threshold amount of time from a profile associated with the product preparation or dispensing unit, and in response to the position sensor exceeding a position threshold for the retrieved threshold amount of time, to transmit the message that the door is open.

2. The system of claim 1, wherein the processor is located on a same premises as the product preparation or dispensing unit.

3. The system of claim 1, wherein the processor is located on a separate premises from where the product preparation or dispensing unit is located.

4. The system of claim 1, wherein the processor is configured to make a determination of whether a door of the product preparation or dispensing unit has been left open based on a comparison between a first temperature sensor and a second temperature sensor attached to the product preparation or dispensing unit.

5. The system of claim 1, further comprising a humidity sensor configured to measure a humidity of the product, the processor being configured to generate the message based on the humidity of the product.

6. The system of claim 1, wherein the processor is configured to determine an amount of time from the message being transmitted until the position sensor no longer exceeds the position threshold.

7. The system of claim 1, wherein the display device configured to generate a store image including the product preparation or dispensing unit and overlay sensor positions with indicators corresponding to measurements that have exceeded product temperature thresholds.

8. The system of claim 1, wherein the display device is a point of sale (POS) machine.

9. The system of claim 1, wherein the processor is configured to generate an electronic coupon in response to the temperature of the product.

10. The system of claim 1, wherein the processor is configured to communicate with a user owned device to determine an identity of a consumer, access a consumer profile, and generate an electronic coupon in response to the temperature of the product.

11. The system of claim 1, wherein the processor is configured to communicate the message with an equipment manufacturer or repair facility and generate a work order in response to the temperature of the product.

12. A system for monitoring a temperature of a product, the system comprising:

a product preparation or dispensing unit containing the product;

at least one temperature sensor proximate the product and configured to measure the temperature of the product at least one temperature sensor configured to measure an ambient temperature;

a database storing a plurality of product profiles each product profile including a ambient temperature limit and a product temperature limit; and a processor configured to compare the temperature of the product to the ambient temperature, the processor being configured to transmit a message including the ambient temperature and the product temperature for presentation on a display device when the ambient temperature exceeds the ambient temperature limit associated with the product or the product temperature exceeds the product temperature limit associated with the product;

the processor further configured to display a user interface at a point of sale location, and to receive data from one of the at least one temperature sensors that prompts a user to input into the user interface at the point of sale a change to the product temperature limit or ambient temperature limit and store the change in the database.

13. The system of claim 12, wherein the processor is configured to retrieve the product temperature limit stored in a database and associated with a record of the product.

14. The system of claim 12, wherein the processor is configured to retrieve an ambient temperature limit stored in a database and associated with a record of the product.

* * * * *